US010675634B2

(12) United States Patent
Stravinski et al.

(10) Patent No.: US 10,675,634 B2
(45) Date of Patent: Jun. 9, 2020

(54) SYSTEMS, METHODS, AND APPARATUSES FOR MANUFACTURING MICRONIZED POWDER

(71) Applicant: Lehigh Technologies, Inc., Tucker, GA (US)

(72) Inventors: Jason Stravinski, Alpharetta, GA (US); Karl Counts, Norcross, GA (US); David Petroni, Lilburn, GA (US)

(73) Assignee: Lehigh Technologies, Inc., Tucker, GA (US)

(*) Notice: Subject to any disclaimer, the term of this patent is extended or adjusted under 35 U.S.C. 154(b) by 1025 days.

(21) Appl. No.: 14/825,912

(22) Filed: Aug. 13, 2015

(65) Prior Publication Data
US 2017/0043351 A1 Feb. 16, 2017

(51) Int. Cl.
B02C 23/10 (2006.01)
B29B 17/02 (2006.01)
(Continued)

(52) U.S. Cl.
CPC ............ B02C 19/186 (2013.01); B02C 23/10 (2013.01); B29B 17/02 (2013.01);
(Continued)

(58) Field of Classification Search
CPC ............... B29B 17/02; B29B 17/0408; B29B 2017/0203; B29B 2017/0227; B02C 19/186; B02C 2201/04
(Continued)

(56) References Cited

U.S. PATENT DOCUMENTS 2,738,930 A 3/1956 Schneider
3,921,917 A * 11/1975 Meinass ............... B02C 19/186
241/17
(Continued)

FOREIGN PATENT DOCUMENTS

DE 7135763 U 2/1973
DE 2736349 A1 2/1979
(Continued)

OTHER PUBLICATIONS

International Search Report mailed in PCT/US2008/002939 filed on Mar. 5, 2008.
(Continued)

Primary Examiner — Shelley M Self
Assistant Examiner — Smith Oberto Bapthelus
(74) Attorney, Agent, or Firm — Dority & Manning, P.A.

(57) ABSTRACT

Systems, methods, and apparatuses for manufacturing micronized powder. The systems, methods, and apparatuses comprise pre-grinding processing, cryogenic freezing, and grinding of infeed material and warming, ferrous metal and fiber removal, accumulation, screening, and storage of micronized powder. Generally, the warming may involve recirculation of micronized powder through the warming apparatus. Further, the accumulation may permit the grinding and screening to occur at their respectively optimal rates, and the fiber removal, via use of a vibrating screener, may increase the purity of the micronized powder. In one embodiment, the micronized powder comprises micronized rubber powder ("MRP").

21 Claims, 4 Drawing Sheets

EXEMPLARY WARMING PROCESS FLOW

(51) Int. Cl.
  *B02C 19/18* (2006.01)
  *B29B 17/04* (2006.01)
  *B29L 30/00* (2006.01)
  *B29K 21/00* (2006.01)
  *B29K 105/00* (2006.01)

(52) U.S. Cl.
  CPC ...... *B29B 17/0408* (2013.01); *B02C 2201/04* (2013.01); *B29B 2017/0203* (2013.01); *B29B 2017/0227* (2013.01); *B29K 2021/00* (2013.01); *B29K 2105/251* (2013.01); *B29L 2030/00* (2013.01); *Y02W 30/625* (2015.05)

(58) Field of Classification Search
  USPC ...................................... 241/23; 219/490–494
  See application file for complete search history.

(56) References Cited

U.S. PATENT DOCUMENTS

| | | | |
|---|---|---|---|
| 4,022,749 A | 5/1977 | Kuechler | |
| 4,025,990 A | 5/1977 | Lovette, Jr. | |
| 4,117,984 A | 10/1978 | Waxelbaum et al. | |
| 4,192,469 A * | 3/1980 | Jager | B02C 15/04 241/121 |
| 4,222,527 A | 9/1980 | Davis | |
| 4,273,294 A | 6/1981 | Hollely et al. | |
| 4,634,061 A | 1/1987 | Williams | |
| 5,385,307 A | 1/1995 | Azar | |
| 5,431,347 A * | 7/1995 | Hayashi | B02C 13/282 241/20 |
| 5,524,838 A | 6/1996 | Ellers et al. | |
| 5,588,600 A * | 12/1996 | Perfido | B29B 17/02 241/152.1 |
| 5,624,078 A | 4/1997 | Bredbeck | |
| 5,634,599 A * | 6/1997 | Khais | B02C 19/186 241/23 |
| 5,735,471 A | 4/1998 | Muro | |
| 5,927,620 A | 7/1999 | Memon | |
| 7,093,781 B2 * | 8/2006 | Meckert | B29B 17/0408 241/23 |
| 7,445,170 B2 | 11/2008 | Cialone et al. | |
| 2002/0144933 A1 * | 10/2002 | Detampel | B02C 19/186 209/3 |
| 2004/0094641 A1 * | 5/2004 | Chen | B02C 4/02 241/19 |
| 2005/0107484 A1 * | 5/2005 | Cialone | B29B 17/02 521/41 |
| 2009/0134257 A1 | 5/2009 | Waznys et al. | |
| 2015/0060429 A1 * | 3/2015 | Song | H01L 23/345 219/209 |

FOREIGN PATENT DOCUMENTS

| | | |
|---|---|---|
| DE | 9309448 U1 | 12/1994 |
| DE | 29601729 U1 | 7/1997 |
| DE | 20106287 U1 | 7/2001 |
| DE | 10116483 A1 | 10/2002 |
| EP | 1199144 A1 | 4/2002 |
| EP | 1247582 A2 | 10/2002 |
| EP | 2377664 A1 | 10/2011 |
| GB | 780748 A | 8/1957 |

OTHER PUBLICATIONS

EPO Extended European Search Report, EP 18208700.7, dated Mar. 15, 2019.

* cited by examiner

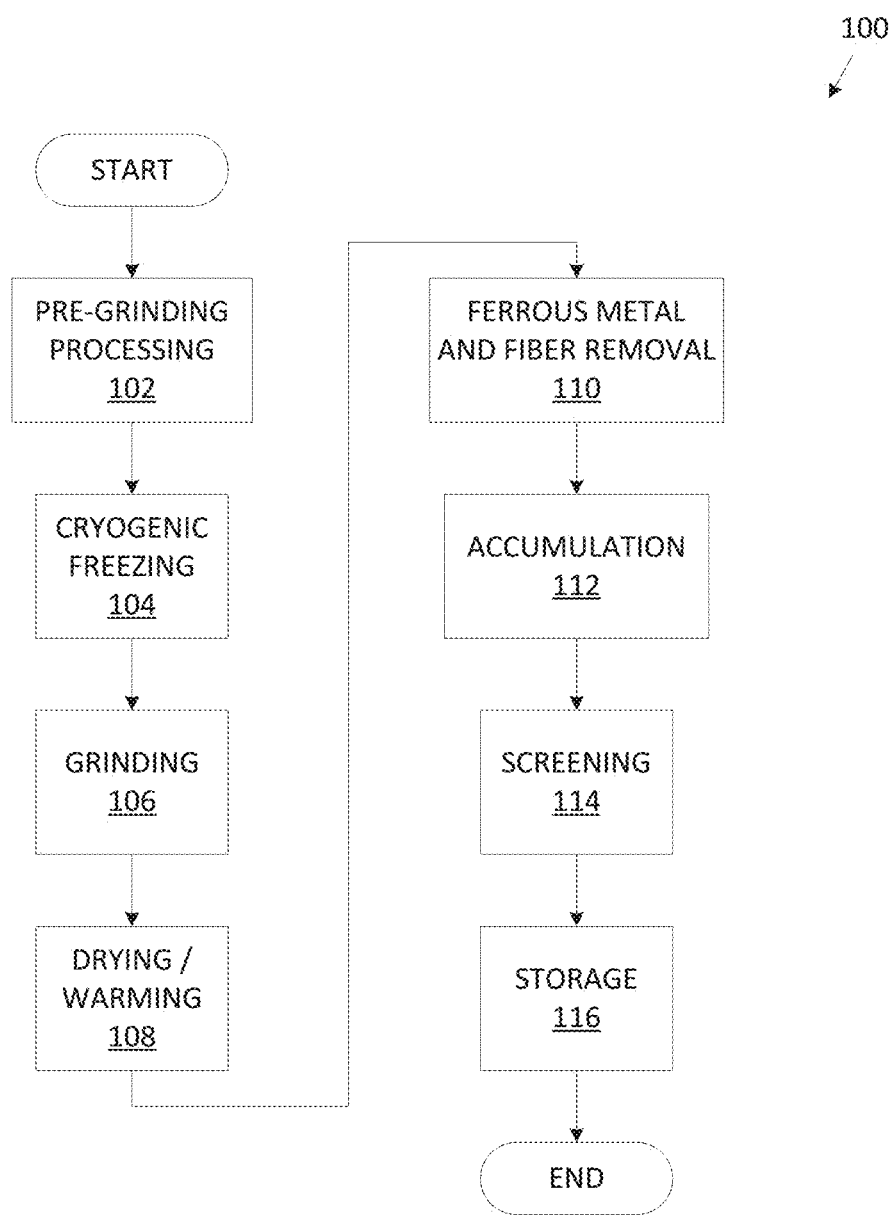
FIG. 1: EXEMPLARY PROCESS FLOW

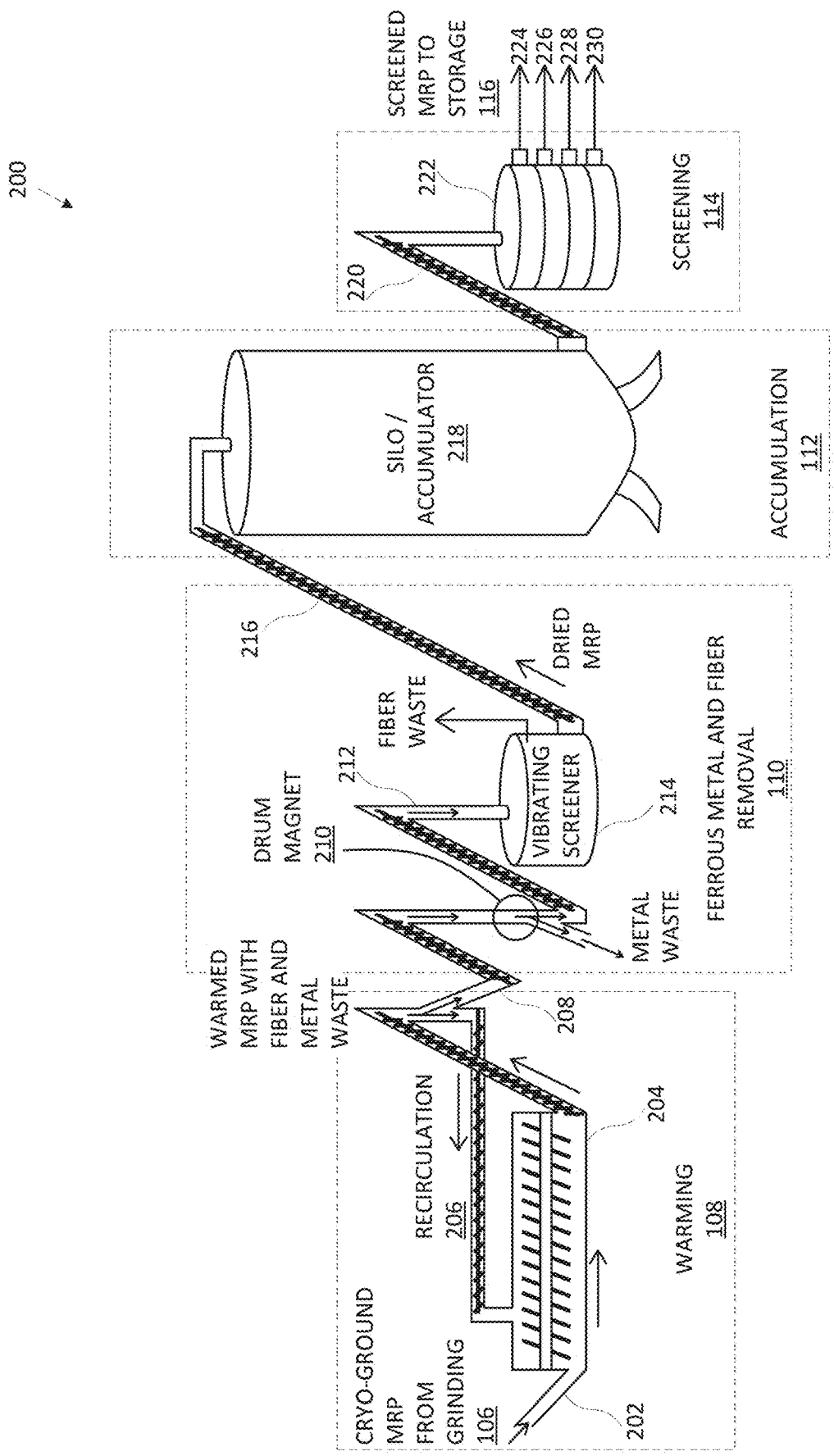
FIG. 2: EXEMPLARY POST-GRINDING PROCESS AND APPARATUSES

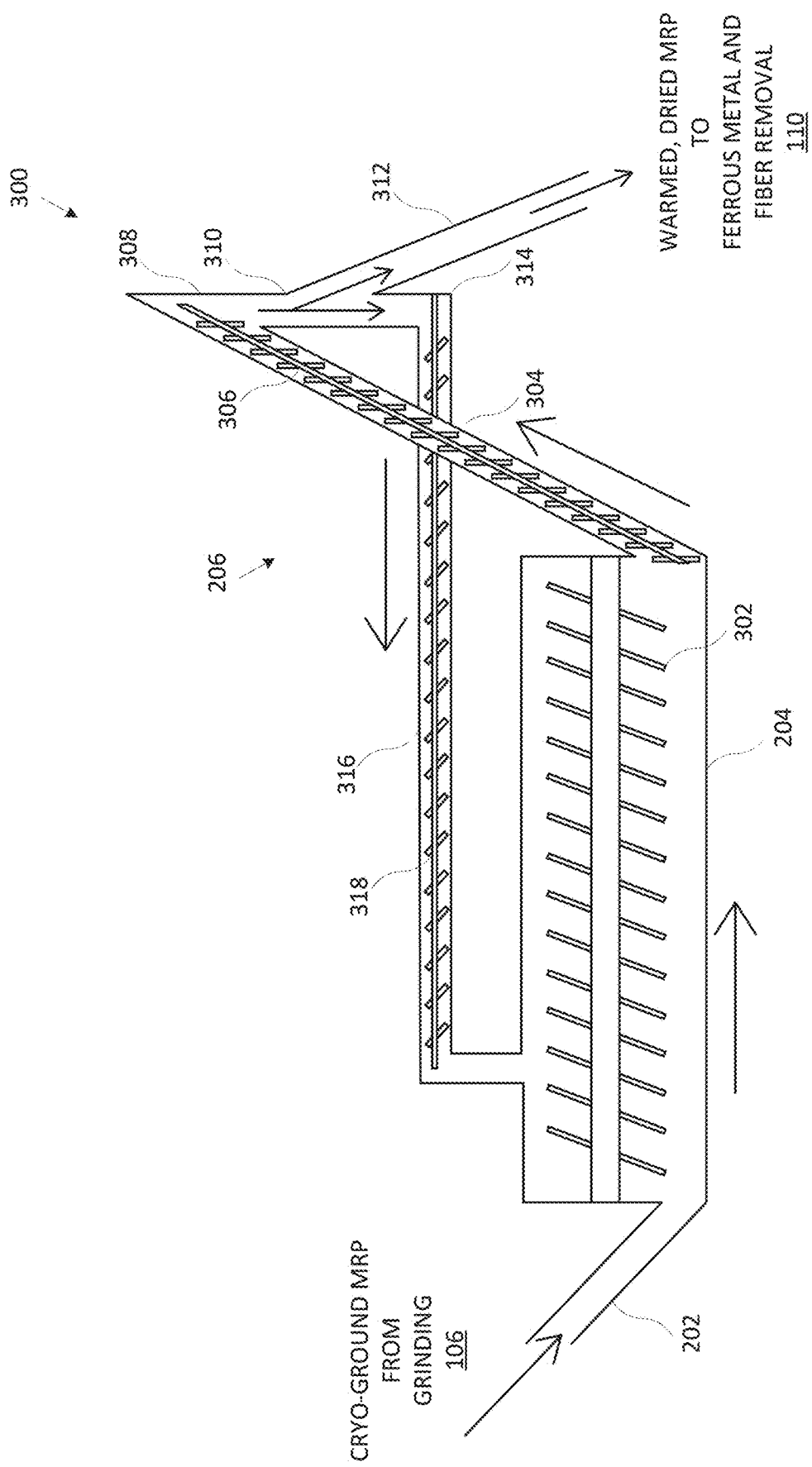
FIG. 3: EXEMPLARY WARMING PROCESS AND APPARATUS

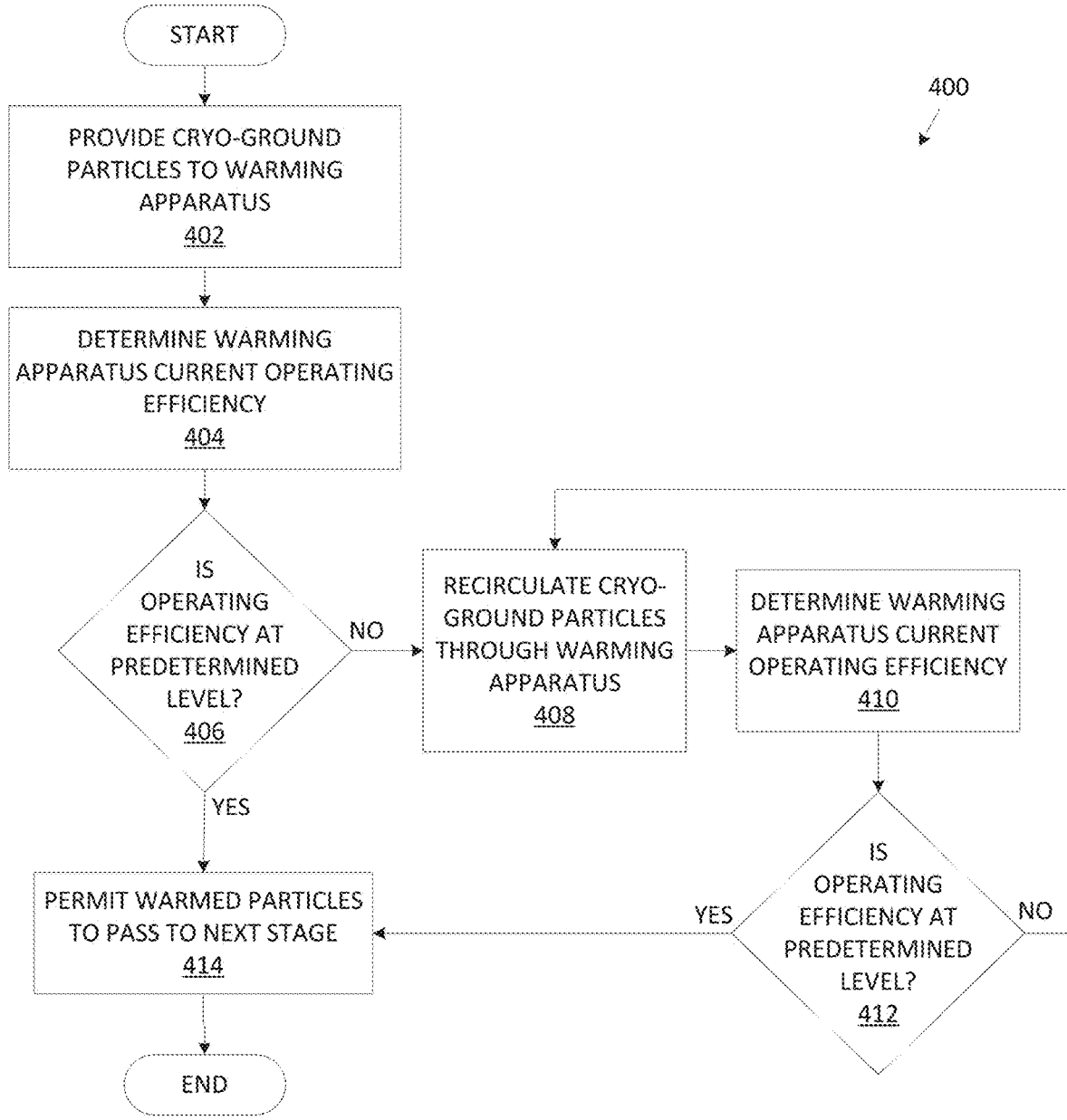
FIG. 4: EXEMPLARY WARMING PROCESS FLOW

SYSTEMS, METHODS, AND APPARATUSES FOR MANUFACTURING MICRONIZED POWDER

TECHNICAL FIELD

The present systems, methods, and apparatuses relate generally to micronized powder production, and more particularly to the production of a predetermined particle size range of micronized powder from materials of heterogeneous size and composition.

BACKGROUND

Micronized powders may be used in various applications (e.g., in the food industry, pharmaceutical industry, plastics industry, rubber industry, etc.). Traditional processes for producing micronized powders, however, are expensive and inefficient.

For example, the disposal of vulcanized rubber, in the form of used tires and other rubber/elastomer articles, represents a major environmental problem. One solution to that problem is to recycle the vulcanized rubber into micronized rubber powder ("MRP"), which can then be used in a variety of applications, including as a filler in new rubber mixes (e.g., tire tread compounds for vehicle tires), plastic formulations (e.g., as fillers for polyolefins), asphalt, etc. In these applications, the MRP is used in place of virgin compound materials and comprises vulcanized elastomer particles of small size (e.g., 2 mm or less in diameter) that conform to the American Society for Testing and Materials standards (e.g., ASTM D-5603-01, which classifies materials according to the maximum size, in U.S. Standard Mesh sizes, of the particles comprising the composition).

Generally, MRP may be produced by cryogenic grinding, chemical processes, and other methods. Some aspects of these traditional processes, however, are expensive and sometimes inefficient. Additionally, the ultimate application in which the MRP is used is determinative of the infeed material for the process, which limits the types of vulcanized rubber that can be recycled through the production of MRP.

BRIEF SUMMARY OF THE DISCLOSURE

Briefly described, and according to one embodiment, aspects of the present disclosure generally relate to systems, methods, and apparatuses for manufacturing micronized powders. Generally, the systems, methods, and apparatuses provide micronized powders in a predictable and predeterminable particle size range and composition in concentrations that permit incorporation of the micronized powders into other applications (e.g., tire manufacturing, asphalt manufacturing, etc.) regardless of the infeed material. In one embodiment, the systems, methods, and apparatuses comprise pre-grinding processing, cryogenic freezing, grinding of infeed material, resultant warming, ferrous metal and fiber removal, accumulation, screening, and storage of micronized powders. Generally, micronized rubber powder ("MRP") is presented throughout this disclosure only for the purposes of illustration and description as a non-limiting, discussion example. Accordingly, this disclosure is not intended to be limiting as to the types of infeed materials that may be manufactured into micronized powders. For example, plastics, food products, etc. may be processed according to the systems, methods, and apparatuses disclosed herein.

As will be described in greater detail herein, aspects of the disclosed systems, methods, and apparatuses permit the use of any vulcanized rubber/elastomer as infeed material regardless of the supplementary materials that were introduced into the vulcanized rubber during its production (e.g., steel plates and fibrous materials in tires). Considering the relatively similar weights between MRP and fibrous materials, removing fibrous materials from MRP is inherently difficult and inefficient. Accordingly, in one exemplary embodiment, the systems, methods, and apparatuses remove fibrous materials from the MRP with a vibrating screener. Generally, the motion of the vibrating screener permits the MRP to pass through the screen while retaining fibrous material on the screen. Thus, fibrous material is removed from the MRP to increase its purity and homogeneity.

Beyond the purity of the MRP, aspects of the disclosed systems, methods, and apparatuses permit the process to run more efficiently. For example, a warming apparatus according to the disclosure, in one embodiment, uses recirculation of MRP as part of a proportional integral derivative loop (e.g., "PID" loop) to better regulate the operating efficiency of the warming apparatus. The increased surface area contact created by the reintroduction of the MRP to the warming apparatus results in more rapid and effective warming of the MRP (e.g., because the increased contact between the particles of the MRP promotes heat transfer between particles and the increased contact between the particles of the MRP and the warming apparatus promotes heat transfer from the warming apparatus to the particles). Generally, as the warming apparatus operates more efficiently, the grinding can occur at a faster, more-efficient rate. This rate, however, may be too fast for efficient and effective screening of the MRP in an overall production/manufacturing line (e.g., either the grinding steps must be slowed or the screening steps sped up in conventional systems to ensure no production line backups). Thus, an accumulator (e.g., storage silo) implemented in accordance with this disclosure between the warming and screening processes may permit the grinding and screening to occur at their respective optimal rates by decoupling the grinding process from the screening process.

In one embodiment, a method of warming cryogenically-ground micronized particles after grinding, comprising the steps of: feeding the micronized particles to a warming apparatus; determining an operating efficiency of the warming apparatus; determining whether the operating efficiency of the warming apparatus is below a predefined threshold; and upon determination that the operating efficiency of the warming apparatus is below a predefined threshold, recirculating the micronized particles through the warming apparatus.

In one embodiment, a method of removing fibrous material from micronized rubber powder (MRP), comprising the steps of: providing a mixture of MRP and fibrous material to a vibrating screener, wherein the mixture includes at least 0.1% fibrous material by mass; operating the vibrating screener for a predetermined amount of time, whereby greater than or equal to 99% of the fibrous material in the mixture remains in the vibrating screener and greater than or equal to 99% of the MRP in the mixture passes through the vibrating screener.

In one embodiment, a method of cryogenically grinding particles, comprising the steps of: grinding chilled granulated particles into micronized powder of broad particle size distribution; warming the micronized powder; accumulating the warmed micronized powder within an accumulating apparatus; and screening the accumulated, warmed micronized powder into one or more predetermined portions, wherein the one or more predetermined portions comprise a predetermined range of particle sizes of the screened, warmed micronized powder.

According to one aspect of the present disclosure, the method of warming cryogenically-ground micronized particles after grinding, wherein the operating efficiency is a first operating efficiency and the method further comprises the steps of: upon recirculation of the micronized particles through the warming apparatus, determining a second operating efficiency of the warming apparatus; and determining whether the second operating efficiency of the warming apparatus is below or above the predefined threshold. Furthermore, the method, further comprising the step of upon determination that the second operating efficiency of the warming apparatus is below the predefined threshold, again recirculating the micronized particles through the warming apparatus. Moreover, the method, further comprising the step of upon determination that the second operating efficiency of the warming apparatus is above the predefined threshold, permitting the micronized particles to exit the warming apparatus. Further, the method, wherein the operating efficiency of the warming apparatus is determined by measuring the amperage produced by one or more motors of the warming apparatus. Additionally, the method, wherein the operating efficiency of the warming apparatus is determined by measuring a temperature of the micronized particles at a predetermined point in the warming apparatus. Also, the method, wherein the operating efficiency of the warming apparatus is determined by measuring a current capacity of the warming apparatus. Furthermore, the method, wherein the operating efficiency of the warming apparatus is determined by measuring a volumetric flow rate of the micronized particles exiting the warming apparatus. Moreover, the method, wherein the operating efficiency of the warming apparatus is determined using a theoretical model. Also, the method, wherein the cryogenically-ground micronized particles comprise cryogenically-ground micronized rubber powder (MRP).

According to one aspect of the present disclosure, the method of removing fibrous material from micronized rubber powder (MRP), wherein the vibrating screener includes a screen of mesh size 20 or 25. Further, the method, wherein the vibrating screener includes at least two screens of mesh size 20 or 25, whereby the MRP passes through the at least two screens. Additionally, the method, wherein the predetermined amount of time is based on the amount of fibrous material within the mixture. Also, the method, wherein the predetermined amount of time is greater than or equal to 1 minute.

According to one aspect of the present disclosure, a method of cryogenically grinding particles, wherein the warmed micronized powder remains within the accumulating apparatus for a predetermined amount of time. Moreover, the method, wherein the step of warming the micronized powder further comprises: feeding the micronized powder to a warming apparatus; determining an operating efficiency of the warming apparatus; determining whether the operating efficiency of the warming apparatus is below a predefined threshold; and upon determination that the operating efficiency of the warming apparatus is below a predefined threshold, recirculating the micronized powder through the warming apparatus. Further, the method, wherein the operating efficiency is a first operating efficiency and the method further comprises the steps of: upon recirculation of the micronized powder through the warming apparatus, determining a second operating efficiency of the warming apparatus; and determining whether the second operating efficiency of the warming apparatus is below or above the predefined threshold. Additionally, the method, further comprising the step of upon determination that the second operating efficiency of the warming apparatus is below the predefined threshold, again recirculating the micronized powder through the warming apparatus. Also, the method, further comprising the step of upon determination that the second operating efficiency of the warming apparatus is above the predefined threshold, permitting the micronized powder to exit the warming apparatus. Furthermore, the method, wherein the chilled granulated particles comprise chilled granulated rubber particles and the micronized powder comprises micronized rubber powder (MRP). Moreover, the method, further comprising the steps of: wherein the warmed MRP is part of a mixture of MRP and fibrous material, providing a predetermined amount of the mixture to a vibrating screener, wherein the predetermined amount of the mixture includes at least 0.1% fibrous material by mass; operating the vibrating screener for a predetermined amount of time, whereby greater than or equal to 99% of the fibrous material by mass in the mixture remains in the vibrating screener and greater than or equal to 99% by mass of the MRP in the mixture passes through the vibrating screener.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is a flowchart showing an exemplary overall process flow for producing micronized rubber powder according to one embodiment of the present disclosure.

FIG. 2 is a schematic representation of the post-grinding process and apparatuses according to one embodiment of the present disclosure.

FIG. 3 is a schematic representation of the warming process and apparatus according to one embodiment of the present disclosure.

FIG. 4 is a flowchart showing an exemplary warming process flow according to one embodiment of the present disclosure.

DETAILED DESCRIPTION

Overview

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems, methods, and apparatuses for manufacturing micronized powders. Generally, the systems, methods, and apparatuses provide micronized powders in a predictable and predeterminable particle size range and composition in concentrations that permit incorporation of the micronized powders into other applications (e.g., tire manufacturing, asphalt manufacturing, etc.) regardless of the infeed material. In one embodiment, the systems, methods, and apparatuses comprise pre-grinding processing, cryogenic freezing, grinding of infeed material, resultant warming, ferrous metal and fiber removal, accumulation, screening, and storage of micronized powders. Generally, micronized rubber powder ("MRP") is presented throughout this disclosure only for the purposes of illustration and description as a non-limiting, discussion example. Accordingly, this disclosure is not intended to be limiting as to the types of infeed materials that may be manufactured into micronized powders. For example, plastics, food products, etc. may be processed according to the systems, methods, and apparatuses disclosed herein.

As will be described in greater detail herein, aspects of the disclosed systems, methods, and apparatuses permit the use of any vulcanized rubber/elastomer as infeed material regardless of the supplementary materials that were introduced into the vulcanized rubber during its production (e.g., steel plates and fibrous materials in tires). Considering the relatively similar weights between MRP and fibrous materials, removing fibrous materials from MRP is inherently difficult and inefficient. Accordingly, in one exemplary embodiment, the systems, methods, and apparatuses remove fibrous materials from the MRP with a vibrating screener. Generally, the motion of the vibrating screener permits the MRP to pass through the screen while retaining fibrous material on the screen. Thus, fibrous material is removed from the MRP to increase its purity and homogeneity.

Beyond the purity of the MRP, aspects of the disclosed systems, methods, and apparatuses permit the process to run more efficiently. For example, a warming apparatus according to the disclosure, in one embodiment, uses recirculation of MRP as part of a proportional integral derivative loop (e.g., "PID" loop) to better regulate the operating efficiency of the warming apparatus. The increased surface area contact created by the reintroduction of the MRP to the warming apparatus results in more rapid and effective warming of the MRP (e.g., because the increased contact between the particles of the MRP promotes heat transfer between particles and the increased contact between the particles of the MRP and the warming apparatus promotes heat transfer from the warming apparatus to the particles). Generally, as the warming apparatus operates more efficiently, the grinding can occur at a faster, more-efficient rate. This rate, however, may be too fast for efficient and effective screening of the MRP in an overall production/manufacturing line (e.g., either the grinding steps must be slowed or the screening steps sped up in conventional systems to ensure no production line backups). Thus, an accumulator (e.g., storage silo) implemented in accordance with this disclosure between the warming and screening processes may permit the grinding and screening to occur at their respective optimal rates by decoupling the grinding process from the screening process.

Exemplary Embodiments

Referring now to the figures, FIG. 1 illustrates a flowchart of an overall exemplary micronized rubber powder ("MRP") production process 100 according to one embodiment of the present disclosure. In various embodiments, the process 100 converts, through cryogenic grinding, a vulcanized infeed material of heterogeneous size and composition (e.g., old tires with metal and fibrous particles) into MRP of homogenous size and composition (e.g., finely-ground vulcanized rubber/elastomer), further details of which are described in U.S. Pat. No. 7,445,170 (entitled "Process and Apparatus for Manufacturing Crumb and Powder Rubber" and filed on Nov. 17, 2003); U.S. Pat. No. 7,258,288 (entitled "Process and Apparatus for Comminuting Phytosterol Particles" and filed on Aug. 10, 2005); U.S. Pat. No. 7,108,207 (entitled "Process and Apparatus for Comminuting Particle Rubber" and filed on Oct. 26, 2004); U.S. Pat. No. 7,093,781 (entitled "Process and Apparatus for Manufacturing Powder Rubber" and filed on Oct. 26, 2004); and U.S. Pat. No. 5,588,600 (entitled "Process and Apparatus for Making Crumb Rubber from Vehicle Tires" and filed on Jun. 7, 1995); the disclosures of which are incorporated by reference herein. Generally, MRP comprises vulcanized elastomer particles, a significant portion of which are less than a predetermined size (e.g., 100 microns). As will be further understood and appreciated, the steps and processes shown in FIG. 1 (and those of all other flowcharts shown and described herein) may operate concurrently and continuously, are generally asynchronous and independent, and are not necessarily performed in the order shown.

Accordingly, at step 102, in various embodiments, the vulcanized infeed material undergoes processing prior to grinding. Generally, the pre-grinding processing modifies the infeed material into a state that is more easily consumed later in the process 100. As will be understood by one having ordinary skill in the art, this pre-grinding processing may vary depending on the infeed material. For example, in one embodiment, large, irregularly-shaped pieces of vulcanized rubber may be roughly ground into smaller pieces so that later cryogenic grinding may be more efficiently performed. Additionally, in one embodiment, the infeed material may be processed to remove some extraneous materials, such a metal (e.g., steel plates from tires), from the infeed material that may be harmful to the mill or other apparatuses used in the cryogenic grinding process. It can be difficult, however, to ensure that all metal and fiber is removed from the pre-ground elastomer infeed material, and, thus, some such extraneous material usually makes its way into the subsequent steps of process 100. Once the pre-grinding processing is complete, the infeed material generally is ready to begin cryogenic freezing.

Still referring to FIG. 1, at step 104, according to various embodiments, the infeed materials are subjected to cryogenic freezing, wherein the temperature of the infeed materials is significantly reduced. In one embodiment, the cryogenic freezing is performed by the introduction of liquid nitrogen to the infeed materials as they are moved through a cylindrical shaped vessel by a rotating auger. As will be understood by one having ordinary skill in the art, because rubber/elastomer is generally malleable and easily deformable, the cryogenic freezing makes the particles more brittle, which makes the subsequent grinding easier and more uniform. Thus, at step 106, the cryogenically-frozen infeed materials are introduced to a grinding apparatus. According to various embodiments, the grinding apparatus grinds the particles into MRP. Generally, the grinding apparatus, in one embodiment, may be a conical-shaped impact mill (versions of which are described in U.S. Pat. No. 7,861,958 (entitled "Conical-Shaped Impact Mill" and filed on Jun. 25, 2008); U.S. Pat. No. 7,900,860 (entitled "Conical-Shaped Impact Mill" and filed on Apr. 5, 2007); U.S. Pat. No. 8,302,892 (entitled "Conical-Shaped Impact Mill" and filed on Jan. 3, 2011); U.S. Pat. No. 8,302,893 (entitled "Conical-Shaped Impact Mill" and filed on Jan. 3, 2011); and U.S. Pat. No. 8,132,751 (entitled "Conical-Shaped Impact Mill" and filed on Jan. 3, 2011); the disclosures of which are incorporated by reference herein). In one embodiment, the cryogenically-frozen infeed materials enter the top of the top of the mill and are pulled by gravity towards the rotor, which is spinning at high speed. Thus, the cryogenically-frozen infeed materials impact the rotor and bounce between the rotor and mill casing until the infeed materials are broken into MRP. In various embodiments, the MRP exiting the grinding apparatus comprises various sizes (e.g., a broad particle size distribution with particles having a size greater than or equal to 50 mesh and also less than or equal to 140 mesh within the same composition, a broad particle size distribution with particles having generally a diameter of 2 mm or less, a broad particle size distribution with particles having a size greater than or equal to 40 mesh and also less than or equal to 200 mesh within the same composition, etc.) and remains at cryogenic temperatures (e.g., −80° F.-−100° F.).

To warm the recently-ground MRP to a temperature at which post-grinding processing can occur, the MRP undergoes warming at step 108. Generally, the details of the warming process will be better understood in association with the descriptions of FIGS. 2-4. In various embodiments, the recently-ground MRP is dried and/or warmed to prevent condensation of water on the MRP as it reaches room temperature after grinding, which can turn the MRP into a spongy solid instead of a powder. In one embodiment, the recently-ground MRP may be recirculated through a warmer until it reaches a certain temperature (e.g., greater than or equal to 80° F., greater than the dew point, etc.), the warmer reaches a certain operating efficiency, a certain flow rate (e.g., 6,000 pounds per hour), and/or a certain operating capacity (e.g., 90%). For example, in one non-limiting example, a level-probe may not read accurately due to MRP sticking to the probe and output temperature may also result in an inaccurate/unreliable reading, so the amperage produced by the motor of the warmer may be measured to determine the current work being performed by the warmer (e.g., operating efficiency). Continuing with this example, if the amperage is below a certain threshold (e.g., at or below 2.5 amperes), then the MRP may be recirculated through the warmer until the amperage increases above the threshold. At that point, the MRP would be permitted to pass through to the ferrous metal and fiber removal apparatuses. In another embodiment, a theoretical model may be used to calculate the operating efficiency of the warming apparatus (e.g., by calculating the operating efficiency based on known variables related to the warmer).

In various embodiments, at step 110, ferrous metal and fibrous materials are removed from the MRP. As will be understood by one having ordinary skill in the art, these materials are viewed as imperfections in the MRP that diminish the purity/quality of the finished product. As mentioned previously, although some of this material is removed during step 102 (pre-grinding processing), there is often more that should be removed after steps 106 (grinding) and 108 (drying/warming). Thus, in one embodiment, the MRP passes over a magnet to remove ferrous metal from the MRP. According to one embodiment, the MRP is processed through a vibrating screener to remove fibrous material. Generally, the details of the removal of ferrous metal and fibrous materials will be better understood in association with the description of FIG. 2.

Referring still to FIG. 1, at step 112, the MRP is accumulated prior to screening, which will be explained in further detail in association with the description of FIG. 2. Generally, accumulating permits the grinding that occurs at step 106 to be decoupled from the screening that occurs at step 114. In various embodiments, the most efficient flow rate for material through the grinding apparatus (step 106) may be different from the most efficient flow rate for material through the screening apparatus (step 114). Thus, in one embodiment, to operate both the grinding apparatus and the screening apparatus at their optimal flow rates, the MRP may be accumulated (e.g., stored, either temporarily or for long periods of time). According to various embodiments, the MRP may be accumulated within a silo, storage bin, drum, flexible intermediate bulk container (e.g., bulk bag), intermediate bulk container, etc.

After accumulation, in various embodiments, the MRP is passed to a screening apparatus at step 114, which will be explained in further detail in association with the description of FIG. 2. Generally, the screening apparatus comprises multiple screens of varying mesh sizes and sorts the MRP by particle size so that the sorted MRP has relatively uniform particle size within predefined, narrow ranges.

Once screened, the MRP may be, in various embodiments, stored and/or packaged at step 116. As will be understood by those having ordinary skill in the art, the storage and/or packaging at step 116 permits the MRP to be used in later applications (e.g., asphalt manufacturing, tire manufacturing, etc.). Generally, storage can be in bags, silos, trucks, etc. When the MRP has been stored, the process 100 ends thereafter.

Now referring to FIG. 2, a schematic representation 200 of the post-grinding process and apparatuses according to one embodiment of the present disclosure is shown. Generally, after cryogenic grinding 106, the MRP undergoes several processing steps to increase the purity and quality of the MRP. As will be appreciated by one having ordinary skill in the art, even after the pre-grinding processing, materials other than vulcanized rubber (e.g., fiber, metal, stone, etc.) may still be present in the MRP. Accordingly, for example, the MRP may undergo warming 108, ferrous metal and fiber removal 110, accumulation 112, and screening 114. Once the post-grinding processing is complete, the MRP may be held in storage 116 until it is needed for another application. Generally, in FIG. 2, the arrows indicate the direct of flow of the MRP, unless otherwise marked (e.g., the arrows indicating metal and fiber waste).

In various embodiments, the recently cryogenically ground MRP enters, via input 202, the warming apparatus 204 (alternatively referred to herein as a "drying apparatus" or a "warmer"). As will be recognized by one having ordinary skill in the art, the MRP is usually still at extremely low temperatures (e.g., −80° F.-−100° F.) when it enters the warming apparatus 204. Generally, the warming apparatus 204 may be any apparatus that can sufficiently warm the MRP to prevent condensation of water from forming and ruining the MRP by turning it into a spongey mass. In one non-limiting embodiment, the warming apparatus 204 may be an 18"×20" Thomas Conveyor piped with 2" insulated pipe attached to a HEAT thermal fluid heat transfer system, details of which can be obtained from the manufacturer via its website, http://www.thomasconveyor.com/. It will be understood that the aforementioned model is just one example of a warming apparatus 204, which may be any model/type that is suitable for the purposes described herein.

In one embodiment, if the warming apparatus 204 is not operating at an adequate efficiency, then the MRP is processed through the recirculation apparatus 206 to recirculate the MRP back through the warming apparatus 204 as part of a PID loop. The recirculation apparatus 206 will be better understood in association with the description of FIGS. 3 and 4.

Still referring to FIG. 2, if the warming apparatus 204 is operating at an adequate efficiency, then, in one embodiment, the MRP passes, via input 208 (e.g., a rotating auger, drag disk conveyor, etc.), to a metal-removal apparatus 210. Generally, the metal-removal apparatus 210 removes any metal that remains in the MRP. In various embodiments, the metal-removal apparatus 210 may be a magnet (e.g., drum magnet, etc.). In one embodiment, the magnet is located at a split in a pipe that the MRP falls through. Accordingly, in that embodiment, the magnet pulls the metal through the split in the pipe while the MRP continues to fall through the pipe. In another embodiment, the metal-removal apparatus 210 is a convexly-shaped slide with ribs on its surface that run parallel to the flow of MRP that is designed to spread the MRP out into a thin layer as the MRP slides down its convex surface (e.g., as it slides from the input 208 to the drum magnet 210), which increases the surface area of the MRP that passes over the drum magnet, thereby improving the efficiency of the metal-removal apparatus 210. In that embodiment, at the end of the slide is a rotating drum magnet, which, as the thin layer of MRP passes over it, removes any metal that remains in the MRP and allows the MRP to pass through it (e.g., the metal sticks to the rotating surface of the drum magnet and is pulled out of the flow of MRP while the MRP passes over the rotating surface of the drum magnet). Thus, in these embodiments, the metal is removed from the MRP so that only non-ferrous materials remain.

To remove non-ferrous and non-vulcanized rubber materials that remain in the MRP, in various embodiments, the MRP enters, via input 212 (e.g., a rotating auger, drag disk conveyor, etc.), a fibrous material-removal apparatus 214. Generally, the fibrous material-removal apparatus 214 removes any non-ferrous and non-vulcanized rubber materials that remain in the MRP (e.g., fibrous materials, etc.). In various embodiments, the fibrous material-removal apparatus 214 may be a vibrating screener with one or more screens of varying mesh sizes (e.g., a Midwestern® ME6058-8-6XP vibrating screener, details of which can be obtained from the manufacturer via its website, https://midwesternind.com/. It will be understood that the aforementioned model is just one example of a fibrous material-removal apparatus 214, which may be any model/type that is suitable for the purposes described herein.). In one embodiment, the vibrating screener comprises one mesh screen of a size that permits the MRP to pass through the mesh screen but traps the fibrous material on the mesh screen (e.g., 20 mesh, 25 mesh, etc.). In that embodiment, the vibrating screener is operated at a speed (e.g., 6,000 pounds per hour) that is sufficient to bounce the MRP up and down on the screen but is not sufficient to completely bounce the fibrous material up and down (e.g., so that the MRP spends at least 1 minute on the screen). Generally, because the fibrous material is elongate in shape, like string, is longer than the MRP, and is not bouncing as high as the MRP, it will not reach an orientation that permits it to pass through the mesh screen. In another embodiment, the vibrating screener comprises two mesh screens of varying sizes that permit the MRP to pass through the mesh screens but trap the fibrous material on the mesh screens (e.g., the first screen is 20 mesh and the second screen is 25 mesh, etc.). In yet another embodiment, the vibrating screener comprises two mesh screens of the same size that permit the MRP to pass through the mesh screens but trap the fibrous material on the mesh screens (e.g., the first and second screens are both 20 mesh, etc.).

Referring still to FIG. 2, once fibrous material has been removed from the MRP, in various embodiments, the MRP enters, via input 216 (e.g., a rotating auger, drag disk conveyor, etc.), an accumulating apparatus 218. Generally, the accumulating apparatus 218 decouples cryogenic grinding 106 from screening 114. In various embodiments, the most efficient flow rate for material through the grinding apparatus is different from the most efficient flow rate for material through the screening apparatus (e.g., the grinding apparatus optimal flow rate is faster than the screening apparatus optimal flow rate). Generally, the recirculation apparatus 206 permits the warming apparatus 204 to run at its optimum efficiency (e.g., most efficient flow rate), which permits the cryogenic grinding to occur at its optimal (e.g., most efficient) flow rate. In particular, more or less MRP may be kept and recirculated through the warmer depending on overall flow. Thus, in one embodiment, to operate both the grinding apparatus and the screening apparatus at their optimal flow rates, the MRP may be accumulated to prevent inefficiencies. According to various embodiments, the MRP may be accumulated within a silo, storage bin, drum, flexible intermediate bulk container (e.g., bulk bag), intermediate bulk container, etc. In various embodiments, the duration of time that the MRP spends in the accumulating apparatus 218 depends on the difference in the optimal flow rates for the cryogenic grinding 106 and screening 114.

Once the MRP has accumulated for a sufficient duration of time, in various embodiments, the MRP enters, via input 220 (e.g., a rotating auger, drag disk conveyor, etc.), a screening apparatus 222. Generally, the screening apparatus 222 is an apparatus that separates the MRP into specific ranges according to particle size. In various embodiments, the screening apparatus 222 contains several mesh screens stacked one on top of another with mesh size increasing from top to bottom so that as the particles fall through the screening apparatus 222 the largest particles remain in the top screen and the smallest particles pass through the bottom screen. As will be appreciated by one having ordinary skill in the art, as mesh number increases, the opening size within the mesh decreases (generally, mesh size is the number of openings within one linear inch of the screen; e.g., 40 mesh has 40 openings in one linear inch). Thus, in one exemplary embodiment, the first mesh screen traps the largest-sized MRP 224 (e.g., particle size greater than or equal to mesh size 40) and permits it to be passed to storage 116. In that exemplary embodiment, the next mesh screen traps the second largest-sized MRP 226 (e.g., particle size greater than or equal to mesh size 80) and permits it to be passed to storage 116. Similarly, in that exemplary embodiment, the third mesh screens trap the third largest-sized MRP 228 (e.g., particle size greater than or equal to mesh size 140) and permits it to be passed to storage 116. Thus, the remaining MRP 230 that is passed to storage 116 is of the smallest particle size (e.g., particle size less than mesh size 140). The above is a non-limiting example; as will be appreciate by one having ordinary sill in the art, the number and size of the mesh screens can vary based on the desired outputs (e.g., mesh sizes from 10 to 500 and as few as 1 screen to more than 10 screens). To further understand the post-grinding processes and apparatuses, a schematic representation of the warming process and apparatus is described next.

Referring now to FIG. 3, a schematic representation 300 of the warming process and apparatus 204 according to one embodiment of the present disclosure is shown. Generally, the warming process (alternatively referred to herein as the drying process or warming/drying 108) occurs immediately after cryogenic grinding 106 to raise the temperature of the MRP quickly so as to prevent the condensation of water on the MRP. If water is permitted to condense on the MRP, it will turn the MRP into a spongy mass. Generally, in FIG. 3, the arrows indicate the direct of flow of the MRP.

In various embodiments, the recently-cryogenically ground MRP enters, via input 202, the warming apparatus 204 (alternatively referred to herein as a "drying apparatus" or a "warmer"). As will be recognized by one having ordinary skill in the art, the MRP is still at extremely low temperatures when it enters the warming apparatus 204. Thus, in various embodiments, the MRP is processed through the warming apparatus 204 to quickly warm the MRP. In one embodiment, the MRP is pulled through the warming apparatus 204 by a rotating auger 302. The auger 302 may operate at different speeds based on factors such as the capacity of the warming apparatus 204, the desired duration of time the MRP should spend in the warming apparatus 204, the volume of the MRP in the warming apparatus 204, etc.

Once the MRP has passed through the warming apparatus 204 an initial time, in various embodiments, it enters an output 304 and is carried by another rotating auger 306 (or, for example, a drag disk conveyor) at an upward angle to a recirculation pipe 308. Generally, the recirculation pipe 308 is part of a recirculation apparatus 206 that may recirculate the MRP back through the warming apparatus 204 if the apparatus is not operating at its optimal efficiency (e.g., as part of a PID loop that attempts to maintain the warming apparatus 204 functioning at its optimal operating efficiency). In various embodiments, the recirculation apparatus 206 permits the warming apparatus 204 to operate at its optimal efficiency regardless of the flow rate of the grinding apparatus (e.g., the grinding apparatus does not have to be slowed to permit the warming apparatus 204 to operate efficiently). In one embodiment, the MRP falls through the recirculation pipe 308 and past a split 310 in the recirculation pipe 308 that branches the recirculation pipe 308 into an output 312 and an accumulation pipe 314. The split 310 is oriented so that the MRP naturally falls down the recirculation pipe 308 into the accumulation pipe 314. Thus, the MRP generally does not enter the output 312 unless the MRP has accumulated to such a level in the accumulation pipe 314 that accumulation pipe 314 has become blocked.

Still referring to FIG. 3, to control the level of accumulation in the accumulation pipe 314, in one embodiment, the accumulation pipe 314 is connected to a reintroduction pipe 316 that contains a rotating auger 318 (or, for example, a drag disk conveyor). Generally, the reintroduction pipe 316 is connected to the first half of the warming apparatus 204 and may permit the reintroduction of the MRP back into the warming apparatus 204. If the warming apparatus 204 is not operating at its optimal efficiency, then, in various embodiments, the auger 318 operates to push the MRP out of the accumulation pipe 314 and recirculate it back into the warming apparatus 204. Once the warming apparatus 204 begins operating at its optimal efficiency and/or volume, in various embodiments, the auger 318 is slowed down so that the MRP begins to accumulate in the accumulation pipe 314 and enter the output 312. Generally, as part of a PID loop, the speed of the auger 318 may be increased or decreased to change the rate of recirculation of the MRP, which similarly increases and decreases the operating efficiency of the warming apparatus 204. As will be appreciated by one having ordinary skill in the art, a PID loop relies on a measured process variable to maintain a process around a desired setpoint. Generally, the PID loop will alternate between increasing the process, based on the variable, until it is above the setpoint and decreasing the process, based on the variable, until it is below the setpoint. Accordingly, the process will oscillate around the setpoint. To further understand the warming process and apparatus, an explanation of the warming process flow may be helpful.

Now referring to FIG. 4, a flowchart is illustrated of an exemplary warming process 400 according to one embodiment of the present disclosure. Generally, the warming process 400 shown occurs as part of warming 108 and may occur in warming apparatus 204 and recirculation apparatus 206 (further details of which can be found in schematic representation 300).

At step 402, in various embodiments, cryogenically-ground MRP is provided to the warming apparatus. According to various embodiments, as the MRP circulates through the warming apparatus, a current operating efficiency of the warming apparatus is determined at step 404. Generally, the operating efficiency may be determined in various ways. For example, the amperage of the motor of the warming apparatus (e.g., coulombs per second, which indicates the amount of work being performed by the motor, with the amperage increasing as the layer depth within the warming apparatus increases), the temperature of the MRP as it exits the warming apparatus, the current amount of MRP (e.g., capacity) within the warming apparatus, the volumetric flow rate of the MRP as it exits the warming apparatus (e.g., the flow of volume through a surface per unit time), etc. may be measured. In another embodiment, a theoretical model may be used to calculate the operating efficiency of the warming apparatus (e.g., by calculating the operating efficiency of the warming apparatus based on known variables related to the warming process 400). As will be appreciated by one having ordinary skill in the art, any measure that provides insight into the operating efficiency of the warming apparatus may be used as part of step 404.

Once the current operating efficiency has been determined, in various embodiments, it is compared to a predetermined level for the operating efficiency of the warming apparatus at step 406 (e.g., 2.5 amperes, 80° F., 90%, 6,000 pounds per hour, etc.). According to one embodiment, if the operating efficiency is below the predetermined level, then, at step 408, the MRP is recirculated back through the warming apparatus (e.g., via recirculation apparatus 206, further details of which can be found in schematic representation 300). As will occur to one having ordinary skill in the art, increasing the amount of MRP within the warming apparatus often improves its operating efficiency because of the increased agitation of the particles within the warming apparatus that increases heat transfer between the particles of MRP (e.g., the warmer MRP comes more frequently into contact with the cooler MRP, which transfers heat from the warm MRP to the cool MRP) and between the particles of MRP and the warming apparatus (e.g., the cooler MRP comes more frequently into contact with the hotter interior sides of the warming apparatus and the auger, which transfers heat from the warming apparatus to the MRP). Generally, when the warming apparatus is operating below the predetermined level, there is not enough agitation of the particles within the warming apparatus to efficiently transfer heat from the warming apparatus to the MRP.

In one embodiment, a second current operating efficiency of the warming apparatus is then calculated at step 410 to determine the operating efficiency of the warming apparatus after reintroduction of the MRP. As will occur to one having ordinary skill in the art, the second current operating efficiency of the warming apparatus may be calculated in the same manner as or in a different manner than the manner in which the first current operating efficiency was calculated at step 404. Generally, at step 412, the second current operating efficiency is compared to the predetermined level for the operating efficiency of the warming apparatus, which, in one embodiment, is the same as the predetermined level from step 406 but, in one embodiment, may be a different predetermined level. For example, in one non-limiting embodiment, the PID loop may have a maximum setpoint (e.g., 90° F.), at which the recirculation apparatus 206 is turned off, so that the recirculation apparatus 206 operates in an energy-efficient manner.

If the second operating efficiency is below the predetermined level, then, in one embodiment, the warming process returns to step 408. If, however, the operating efficiency is above the predetermined level (either as determined at step 406 or step 412), then, in various embodiments, the MRP is permitted to pass to the next stage of the post-grinding process at step 414, and the warming process ends thereafter.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method of warming cryogenically-ground micronized particles after grinding, comprising the steps of:
    feeding the micronized particles to a warming apparatus;
    determining an operating efficiency of the warming apparatus;
    determining whether the determined operating efficiency of the warming apparatus is below a predefined threshold operating efficiency for the warming apparatus;
    upon determination that the determined operating efficiency of the warming apparatus is below the predefined threshold operating efficiency for the warming apparatus, recirculating the micronized particles through the warming apparatus;
    upon determination that the determined operating efficiency of the warming apparatus is above the predefined threshold operating efficiency for the warming apparatus, feeding the micronized particles from the warming apparatus to a screening apparatus; wherein
    the step of determining the operating efficiency of the warming apparatus is carried out upstream of the screening apparatus.

2. The method of claim 1, wherein the determined operating efficiency is a first determined operating efficiency and the method further comprises the steps of:
    upon recirculation of the micronized particles through the warming apparatus,
    determining a second operating efficiency of the warming apparatus; and
    determining whether the second operating efficiency of the warming apparatus is below or above the predefined threshold operating efficiency for the warming apparatus.

3. The method of claim 2, further comprising the step of upon determination that the second operating efficiency of the warming apparatus is below the predefined threshold operating efficiency for the warming apparatus, again recirculating the micronized particles through the warming apparatus.

4. The method of claim 2, further comprising the step of upon determination that the second operating efficiency of the warming apparatus is above the predefined threshold operating efficiency for the warming apparatus, permitting the micronized particles to exit the warming apparatus.

5. The method of claim 1, wherein the step of determining the operating efficiency of the warming apparatus comprises measuring the amperage produced by one or more motors of the warming apparatus.

6. The method of claim 1, wherein the step of determining the operating efficiency of the warming apparatus comprises measuring a temperature of the micronized particles at a predetermined point in the warming apparatus.

7. The method of claim 1, wherein the step of determining the operating efficiency of the warming apparatus comprises measuring a current capacity of the warming apparatus.

8. The method of claim 1, wherein the step of determining the operating efficiency of the warming apparatus comprises measuring a volumetric flow rate of the micronized particles exiting the warming apparatus.

9. The method of claim 1, wherein the step of determining the operating efficiency of the warming apparatus comprises using a theoretical model.

10. The method of claim 1, wherein the cryogenically-ground micronized particles comprise cryogenically-ground micronized rubber powder (MRP).

11. A method of cryogenically grinding particles, comprising the steps of:
    grinding chilled granulated particles into micronized powder of a broad particle size distribution;
    warming the micronized powder in a warming apparatus;
    feeding the warmed micronized powder from the warming apparatus to an accumulating apparatus;
    accumulating the warmed micronized powder within the accumulating apparatus, the accumulating apparatus comprising a silo, a storage bin, a bulk bag, or a bulk container;
    feeding the accumulated, warmed micronized powder from the accumulating apparatus to a screening apparatus; and
    screening the accumulated, warmed micronized powder into one or more predetermined portions at the screening apparatus, wherein the one or more predetermined portions comprise a predetermined range of particle sizes of the screened, warmed micronized powder, the accumulating apparatus decoupling a rate of grinding the chilled granulated particles from a rate of screening the accumulated, warmed micronized powder, wherein the step of warming the micronized powder further comprises: feeding the micronized powder to the warming apparatus; determining an operating efficiency of the warming apparatus, the operating efficiency providing information with regard to the effective warming by the warming apparatus of the micronized particles; determining whether the determined operating efficiency of the warming apparatus is below a predefined threshold operating efficiency for the warming apparatus; and upon determination that the determined operating efficiency of the warming apparatus is below a predefined threshold operating efficiency for the warming apparatus, recirculating the micronized powder through the warming apparatus.

12. The method of claim 11, wherein the warmed micronized powder remains within the accumulating apparatus for a predetermined amount of time.

13. The method of claim 11, wherein the determined operating efficiency is a first determined operating efficiency and the method further comprises the steps of:

upon recirculation of the micronized powder through the warming apparatus, determining a second operating efficiency of the warming apparatus; and determining whether the second operating efficiency of the warming apparatus is below or above the predefined threshold operating efficiency for the warming apparatus.

14. The method of claim 13, further comprising the step of upon determination that the second operating efficiency of the warming apparatus is below the predefined threshold operating efficiency for the warming apparatus, again recirculating the micronized powder through the warming apparatus.

15. The method of claim 13, further comprising the step of upon determination that the second operating efficiency of the warming apparatus is above the predefined threshold operating efficiency for the warming apparatus, permitting the micronized powder to exit the warming apparatus.

16. The method of claim 11, wherein the chilled granulated particles comprise chilled granulated rubber particles and the micronized powder comprises micronized rubber powder (MRP).

17. The method of claim 16, further comprising the steps of:

wherein the warmed MRP is part of a mixture of MRP and fibrous material, providing a predetermined amount of the mixture to a vibrating screener, wherein the predetermined amount of the mixture includes at least 0.1% fibrous material by mass;

operating the vibrating screener for a predetermined amount of time, whereby greater than or equal to 99% of the fibrous material by mass in the mixture remains in the vibrating screener and greater than or equal to 99% by mass of the MRP in the mixture passes through the vibrating screener.

18. A method of cryogenically grinding particles, comprising the steps of:

grinding chilled granulated particles into micronized powder of a broad particle size distribution at a grinding rate;

warming the micronized powder in a warming apparatus;

feeding the warmed micronized powder from the warming apparatus to an accumulating apparatus;

accumulating the warmed micronized powder within the accumulating apparatus;

feeding the accumulated, warmed micronized powder from the accumulating apparatus to a screening apparatus; and screening the accumulated, warmed micronized powder into one or more predetermined portions at a screening rate;

wherein the one or more predetermined portions comprise a predetermined range of particle sizes of the screened, warmed micronized powder; and wherein the grinding rate differs from the screening rate, wherein the step of warming the micronized powder further comprises: feeding the micronized powder to the warming apparatus; determining an operating efficiency of the warming apparatus, the operating efficiency providing information with regard to the effective warming by the warming apparatus of the micronized particles; determining whether the determined operating efficiency of the warming apparatus is below a predefined threshold operating efficiency for the warming apparatus; and upon determination that the determined operating efficiency of the warming apparatus is below a predefined threshold operating efficiency for the warming apparatus, recirculating the micronized powder through the warming apparatus.

19. The method of claim 18, wherein the determined operating efficiency is a first determined operating efficiency and the method further comprises the steps of:

upon recirculation of the micronized powder through the warming apparatus, determining a second operating efficiency of the warming apparatus; and determining whether the second operating efficiency of the warming apparatus is below or above the predefined threshold operating efficiency for the warming apparatus.

20. The method of claim 19, further comprising the step of upon determination that the second operating efficiency of the warming apparatus is below the predefined threshold operating efficiency for the warming apparatus, again recirculating the micronized powder through the warming apparatus.

21. The method of claim 19, further comprising the step of upon determination that the second operating efficiency of the warming apparatus is above the predefined threshold operating efficiency for the warming apparatus, permitting the micronized powder to exit the warming apparatus.

* * * * *